(12) United States Patent
Reuschel (10) Patent No.: US 10,641,364 B2
(45) Date of Patent: May 5, 2020

(54) MUFFLED SELF-ALIGNING BEARING IN DECOUPLING BELT TENSIONING UNITS (71) Applicant: Schaeffler Technologies AG & Co. KG, Herzogenaurach (DE)

(72) Inventor: Sascha Reuschel, Hersbruck (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 96 days.

(21) Appl. No.: 15/768,653

(22) PCT Filed: Nov. 8, 2016

(86) PCT No.: PCT/DE2016/200502
§ 371 (c)(1),
(2) Date: Apr. 16, 2018

(87) PCT Pub. No.: WO2017/080552
PCT Pub. Date: May 18, 2017

(65) Prior Publication Data
US 2018/0298995 A1 Oct. 18, 2018

(30) Foreign Application Priority Data

Nov. 11, 2015 (DE) ........................ 10 2015 222 238

(51) Int. Cl.
*F16H 7/12* (2006.01)
*F02B 67/06* (2006.01)
*F16H 7/08* (2006.01)

(52) U.S. Cl.
CPC ........... *F16H 7/1218* (2013.01); *F02B 67/06* (2013.01); *F16H 7/0838* (2013.01); *F16H 7/1281* (2013.01); *F16H 2007/0842* (2013.01); *F16H 2007/0874* (2013.01)

(58) Field of Classification Search
CPC ........... F16H 7/1281; F16H 2007/0806; F16H 2007/0874; F16H 2007/0893; F02B 67/06
USPC ................................................. 474/134, 135
See application file for complete search history.

(56) References Cited

U.S. PATENT DOCUMENTS

| | | | | |
|---|---|---|---|---|
| 5,795,257 | A * | 8/1998 | Giese | F16H 7/1218 474/109 |
| 7,384,355 | B2 * | 6/2008 | Ayukawa | F16H 7/1218 474/109 |
| 7,497,794 | B2 * | 3/2009 | Lannutti | F16H 7/1218 474/133 |

(Continued)

FOREIGN PATENT DOCUMENTS

| | | |
|---|---|---|
| DE | 102006022491 | 1/2008 |
| DE | 102011084680 | 11/2012 |

(Continued)

*Primary Examiner* — Henry Y Liu
(74) *Attorney, Agent, or Firm* — Volpe and Koenig, P.C.

(57) ABSTRACT

A belt tensioner (1) for a belt drive for auxiliary units in an internal combustion engine, including a tensioner housing (2), a tensioner lever (3) and a plain bearing for radially mounting the tensioner lever (3) in the tensioner housing (2) in order to allow the tensioner lever (3) to pivot; a bearing partner associated with the tensioner lever (3) is in sliding contact with a second bearing partner associated with the tensioner housing (2). One of the two bearing partners is suspended in a radially elastic manner on the associated part that supports the bearing partner in a rotationally fixed manner.

16 Claims, 8 Drawing Sheets

(56) References Cited

U.S. PATENT DOCUMENTS

| | | | | |
|---|---|---|---|---|
| 8,172,049 B2* | 5/2012 | Klingler | F16D 65/0006 |
| | | | 188/156 |
| 8,545,352 B2* | 10/2013 | Lannutti | F16H 7/1218 |
| | | | 474/115 |
| 8,968,128 B2* | 3/2015 | Wolf | F16H 7/1281 |
| | | | 474/135 |
| 9,103,411 B2* | 8/2015 | Wolf | F16H 7/1281 |
| 9,416,853 B2* | 8/2016 | Wolf | F02B 67/06 |
| 9,625,013 B2* | 4/2017 | Wolf | F16H 7/1281 |
| 2009/0298631 A1* | 12/2009 | Jud | F16H 7/1281 |
| | | | 474/237 |
| 2013/0040770 A1* | 2/2013 | Wolf | F16H 7/1281 |
| | | | 474/134 |
| 2013/0095967 A1* | 4/2013 | Wolf | F16H 7/1281 |
| | | | 474/135 |
| 2013/0203535 A1* | 8/2013 | Mack | F16H 7/1281 |
| | | | 474/134 |
| 2016/0363197 A1* | 12/2016 | Wolf | F16H 7/1281 |

FOREIGN PATENT DOCUMENTS

| | | |
|---|---|---|
| DE | 202012209028 | 12/2013 |
| DE | 102013002993 | 8/2014 |
| DE | 102013203522 | 9/2014 |
| EP | 2128489 | 12/2009 |
| EP | 2557295 | 2/2013 |

* cited by examiner

MUFFLED SELF-ALIGNING BEARING IN DECOUPLING BELT TENSIONING UNITS

BACKGROUND

The invention relates to a belt tensioner for an auxiliary unit belt drive of an internal combustion engine with a tensioner housing, with a tensioner lever, and with a sliding bearing for the pivoting radial support of the tensioner lever in the tensioner housing, wherein a bearing partner associated with the tensioner lever is in sliding contact with a second bearing partner allocated to the tensioner housing.

From the prior art, such belt tensioners are known, e.g., these are also designated as self-aligning tensioners. Such self-aligning tensioners are alternatively also designated as self-aligning roller tensioners or ring tensioners. They are already known from the prior art in various constructions.

In this context, e.g., DE 10 2011 084 680 B3 discloses a tensioning device for a belt rive that has an endlessly revolving belt, an electric machine with a machine housing and a drive wheel and at least one other driving wheel that is in drive connection with the drive wheel via the belt. The tensioning device comprises a tensioner housing that is supported by a sliding bearing so that it can pivot about the axis of the drive wheel relative to the machine housing, two tensioning rollers that load the belt with pretensioning force in front of and behind the drive wheel in its direction of revolution, a spring that generates the pretensioning force, a tensioning arm that is supported against the force of the spring so that it can move in the tensioner housing, wherein one of the tensioning rollers is supported on the tensioning arm and the other tensioning roller is supported fixed in position on the tensioner housing, and a bearing carrier spans the tensioner housing in the axial direction.

Other prior art is known from EP 2 557 295 B1 and DE 10 2012 209 028 A1.

Noise-damped self-aligning bearings of decoupling tensioners can be used in critical start-stop drives that tend to generate noise due to, among other things, their layout by an unfavorable position of the resultant forces and associated low resultant radial forces on the self-aligning bearing and very high dynamic response that can result due to the lifting and dropping of one friction partner on the other. Typically, namely a base plate that is part of a tensioner lever is injection molded, wherein this injection molded end is held between a closing disk that is part of the tensioner housing and an adapter plate. The axial lengths are easily adjustable, but this is problematic in the radial direction. Under unfavorable conditions, this namely produces impacts or rattling in the radial direction. Adapter plates and closing disks are typically mounted stationary on the alternator, wherein the base plate is injection molded and connected rigidly to the housing and thus to the rest of the tensioner. An oscillating motion is provided. Under the already described circumstances, in the known systems, the resulting radial force on the self-aligning bearing can temporarily become zero or even reverse, which can lead to high-frequency lifting and impacting of the base plate on the closing disk. The injection molded part here impacts the closing disk. This can lead, in turn, to the generation of undesired noise.

Solutions have been put forward in which layout optimizations are performed in order to keep a resulting radial force on the pendulum bearing constantly greater than zero even for a counteracting dynamic response. However, this cannot always be implemented due to the installation space, customer requirements, etc. Changes to the corresponding tensioner parameters in order to reduce the dynamic response effect in order to, in turn, achieve a resultant radial force on the self-aligning bearing that is always greater than zero can also not be implemented in every tensioner design/drive.

The provision of an external pretensioning of the self-aligning bearing, in order to obtain a resultant radial force on the self-aligning bearing that is always greater than zero even for a counteracting dynamic response, e.g., through the use of a plate spring, would also be a conceivable solution that, however, would be considered disadvantageous for an O-ring as a damper with respect to weight, installation space, and costs. Minimizing the radial play in order to prevent lifting, despite the raised resultant radial force on the self-aligning bearing, does produce an improvement, but this cannot be implemented (in a cost neutral manner) in series production due to manufacturing, tolerance, and wear conditions.

Another complaint is that, in certain cases, it is not possible to design the tensioner or the drive so that in all operating cases viewed over the service life, the resultant radial force on the self-aligning bearing is greater than zero. For such drives, the noise can be prevented only by structural changes. A pretensioning of the self-aligning bearing, however, is not possible in a way that is neutral in terms of installation space, costs, and weight. Another possibility in addition to avoiding the cause, that is, preventing the lifting, would be an alternative approach.

SUMMARY

However, the objective of the present invention is to eliminate or at least reduce the disadvantages from the prior art and, in particular, to disclose a better functioning solution that is neutral in terms of installation space, costs, and weight. For a device according to the class, this is solved according to the invention in that one of the two bearing partners is attached/connected/supported/contacted/linked to the respective component holding it locked in rotation in a radially elastic manner, namely either on the tensioner housing section or a tensioner lever section.

The invention thus prevents the propagation of noise. Therefore, it avoids the consequence. This is the approach of the invention presented here such that it implements the principle of a so-called "sound measuring chamber," for noise damping. The lifting is not prevented by the structural design with a damper constructed, e.g., as an O-ring, but the dropping is damped by this O-ring, which prevents the transmission of the resulting oscillations to the other components, so that no carrier can be produced for the noise. The invention is a functional improvement accordingly in that the noise considered critical for the application is avoided. Compared with spring-tensioned solutions, the O-ring variant is preferred, because it has advantages in terms of installation space, weight, and cost. O-rings are offered as standard parts in countless sizes for economical prices in large quantities.

The belt tensioner is thus not improved with respect to layout and dynamic response. This is because for the increased force resulting from high dynamic response on the self-aligning bearing, a friction partner can still be lifted and dropped onto the other, fixed friction partner, but the result is significantly improved. For high-frequency oscillations, an improved noise response is achieved.

One could also say that the self-aligning bearing or, more precisely, the closing disk has a two-part construction in the invention, so that the damping element, e.g., an O-ring as an economical standard part, can be arranged in between and thus, on one side, the friction pair plastic-aluminum or plastic-steel is still present and on the other side, the propagation of oscillations due to the lifting/dropping of the base plate on the closing disk is "absorbed." A targeted change in frequency is performed if that is more appealing if detected. The use of O-rings is offered.

The O-ring or can also be designated generally as damper is to be constructed accordingly so that contact is not possible between an intermediate ring and a closing disk in the radial direction. This is possible due to the cross-section diameter of the O-ring, and also the axial pre-tensioning of just this O-ring. The movement energy of the intermediate ring due to the lifting and dropping of the base plate is damped by the O-ring and in this way the noise propagation is prevented. Furthermore, the intermediate ring and the closing disk should be supported so that they are locked in rotation relative to each other, which can be implemented, e.g., by intermeshing tabs. At least one tab should be inserted, e.g., with play in the circumferential direction. It is better if two tabs are used, e.g., offset relative to each other by 180°. Even more tabs are even more advantageous. However, in each case, play should be provided in the radial direction.

By use of the invention, the previously known problem is sustainably solved. Specifically, the radial play in the self-aligning bearing, which otherwise cannot be adjusted very exactly due to the manufacturing, can now be left relatively large due to tolerances, differently than the axial play, but the radial movements of the bearing no longer impact without damping. The base plate now no longer impacts against the closing disk in the radial direction without damping. The resulting noise is improved significantly according to the invention such that the noise propagation is prevented due to the impacts of the base plate. This is realized, e.g., by an intermediate ring that is supported elastically in the radial direction relative to the closing disk and always with spacing. In one of the following examples, this is just an O-ring.

Naturally it is also possible to use an elastomer injection molding alternatively or additionally, e.g., to injection mold an intermediate ring with elastomer. The intermediate ring is always to be secured against rotation relative to the closing disk. The required radial movement must not be impeded.

Naturally it is known that O-rings are used for noise damping. For example, DE 10 2006 022 491 A1 discloses a noise-damped brake. However, the loads in brakes are completely different than in belt tensioners.

Advantageous embodiments are claimed in the dependent claims and are explained in more detail below.

Thus, it is advantageous if the rotationally fixed component has a two-part construction such that it forms a base body that is separate and/or materially identical or materially different from a sliding device that is provided as much as possible to realize a radial sliding contact with the other bearing partner.

It has also proven advantageous if the base body and the sliding device formed as an intermediate ring forms the tensioner housing or the tensioner lever. The two components thus together form the sliding device or the tensioner lever.

If the sliding device is held on the base body rotationally fixed, but preferably displaceable in the radial direction relative to the base body, then a friction contact between the sliding device and the base body is ruled out, which has positive effects on the service life.

One advantageous embodiment is characterized in that between the base body and the sliding device there is elasticity or such an elastic damping component that is formed more elastic than the base body and/or the sliding device, preferably such that a sound frequency generated in the area of the sliding bearing is transformed or the sound generated there is "absorbed"/reduced/damped. Rubber and/or plastic materials are offered for use for this purpose.

To be able to guarantee a quick and economical connection of the individual components, it is advantageous if the intermediate ring is rotationally secured on the base body of the tensioner housing with a non-positive fit, substance fit, and/or positive fit connection.

It is advantageous when multiple projections according to the design of tabs each engage in a recess according to the design of openings, e.g., blind hole-like molded recesses. Such connections can be produced with non-cutting, e.g., deep-drawing processing steps. Such production is economical.

It has proven advantageous if the tabs are offset from each other by 180°, 120°, or 90°. Sufficiently good rotational locking is then provided. It is also advantageous if the elastic suspension is realized by an O-ring or a spring, wherein the O-ring is preferably made from/comprises NBR (nitrile rubber), HNBR (hydrogenated nitrile butadiene rubber), or AEM (ethylene acrylate rubber) and further has a cross-section thickness of approx. 2 mm to approx. 3 mm.

If the/an O-ring is (also) located between the two bearing partners, then another variant can be realized. Naturally, here there is the risk that the O-ring is abraded, because it forms a sliding contact connection.

Due to production, a radial play between the base body and the sliding device between approx. 0.4 mm to approx. 0.6 mm is required, preferably approx. 0.5 mm.

Naturally, the invention also relates to an internal combustion engine with such a belt tensioner of the type according to the invention and also to an auxiliary unit belt drive with such a belt tensioner.

In other words, the invention relates to a belt tensioner for an auxiliary unit belt drive of an internal combustion engine, comprising: a tensioner housing, a tensioner lever, for example, with a tensioning roller, and a sliding bearing for the pivoting radial support of the tensioner lever in the tensioner housing, wherein a first bearing partner, e.g., a surface, associated with the tensioner lever is in sliding contact with a second bearing partner, e.g., also a surface, associated with the tensioner housing. In particular, between the tensioner housing or the tensioner lever and the associated bearing partner, there is an elasticity and this bearing partner is constructed as a separate bearing component that is arranged radially floating in the sliding bearing against the radial force of the elasticity. The elasticity, e.g., due to the O-ring, and the intermediate ring can also, in kinematic reversal, be between the base plate and the sliding contact. Rotational locking of the intermediate ring, for example, according to the construction of wet recesses, do not have to be rectangular constructions. However, this shape is provided. This shape is advantageous if the rotational locking function is planned but there should be some amount of play, so that the intermediate ring can move radially.

BRIEF DESCRIPTION OF THE DRAWINGS

The invention is explained in more detail below with the help of a drawings. Shown are:

FIG. 1 a perspective representation of a belt tensioner according to the invention, FIG. 2 another representation of the belt tensioner from FIG. 1, FIG. 3 an injection-molded base plate that shows a tensioner lever of the belt tensioner of FIGS. 1 and 2 in a perspective representation, FIG. 4 a portion of the tensioner housing that is formed as a closing disk and acts as a base body, FIG. 5 an intermediate ring that interacts with the base body and assumes the function of a sliding device, FIG. 6 a partially represented longitudinal section representation through a first embodiment of a belt tensioner according to the invention, FIG. 7 a schematic representation of the reaction of a damper when lifting/dropping the intermediate ring on the closing disk in the molded state, FIG. 8 the schematic reaction of the damper when lifting/dropping the base plate, in the lifted state, that is, non-deformed state of the damper/O-ring, wherein the impact of the molded base plate on the closing disk is softened such that the intermediate ring is used in a vibration and thus noise-damping manner due to a damper, namely the O-ring, FIG. 9 an alternative cross-sectional shape of the damper, such that in addition to an O-ring made from plastic, rubber, or another material, a V-ring like design is also realized such that by pretensioning the lips the radial force is also increased to a certain extent, that is, a quasi-pretensioned damper device can be used, FIG. 10 a variant in which an elastomer injection molding of the intermediate ring is used so that the elastomer injection molding is inserted between the closing disk and the intermediate ring, in addition to an adapter plate, and FIG. 11 another solution in which, in addition to the solution with the intermediate ring, noise damping is realized with insert parts.

DETAILED DESCRIPTION

The figures have a merely schematic nature and are used only for understanding the invention. The same elements are provided with the same reference symbols. Features of the individual embodiments can also be interchanged with each other.

Figure 1:
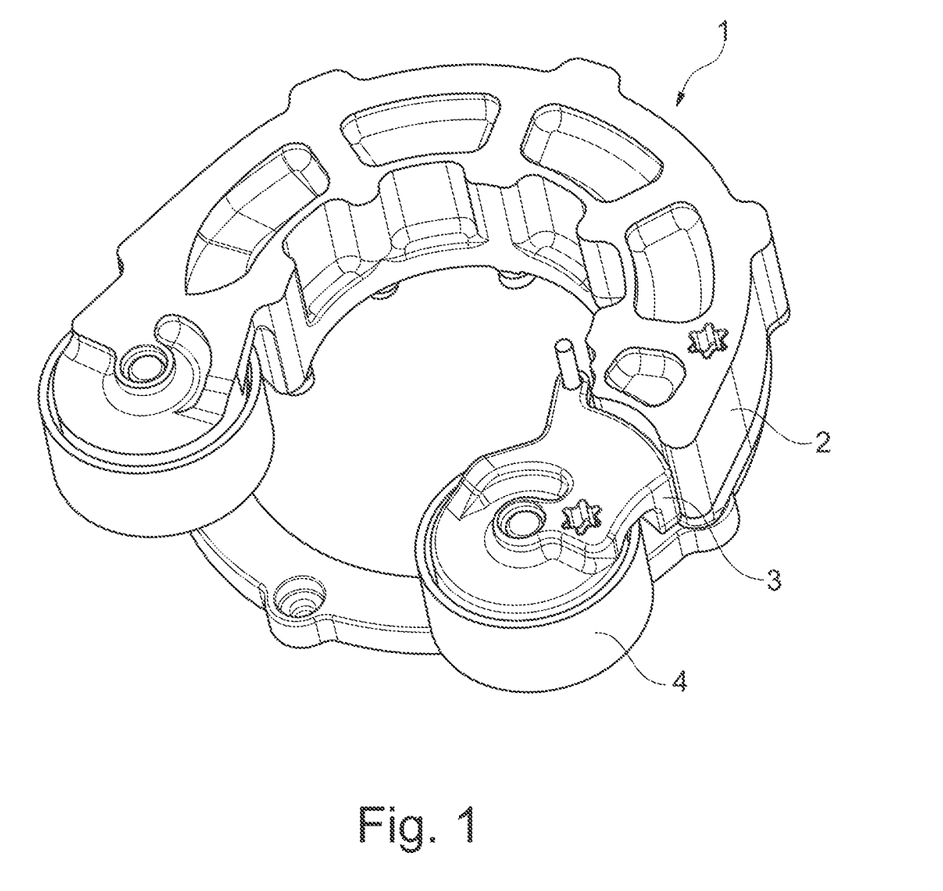

In FIG. 1, a first embodiment of a belt tensioner 1 according to the invention is shown. It has a tensioner housing 2 and a tensioner lever 3 that can be displaced in the radial direction relative to the housing. A tensioning roller 4 is connected to the tensioner lever 3, namely so that the roller can rotate.

Figure 2:
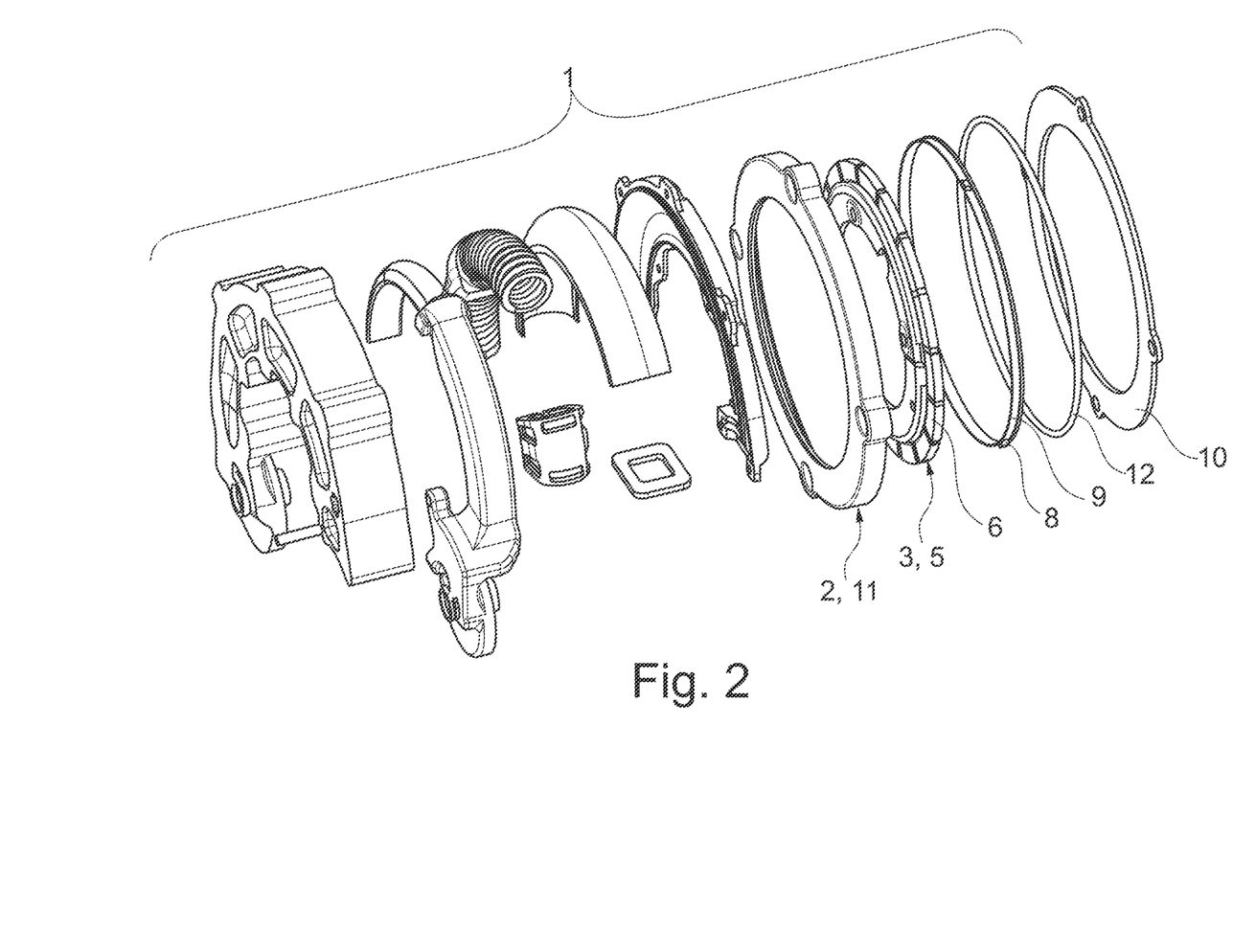
Figure 3:
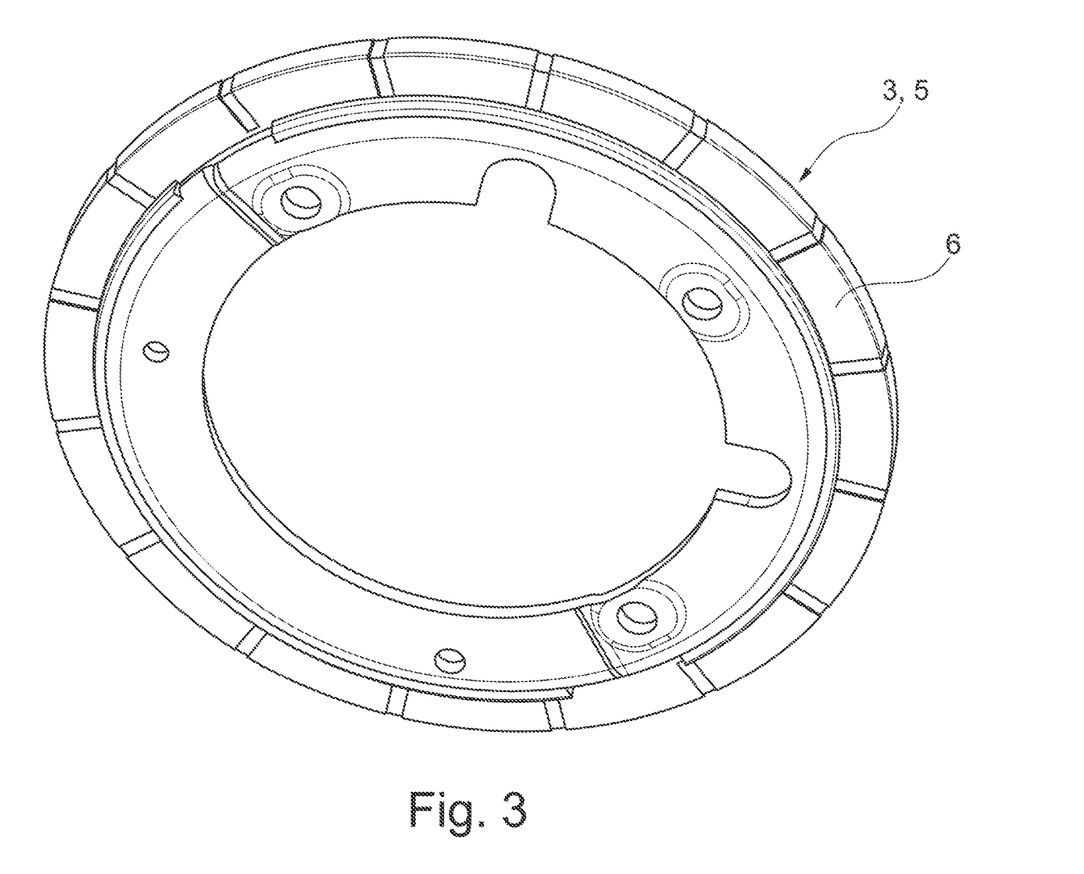

In FIG. 2, the tensioner lever 3 is formed according to the construction of a base plate 5 that has an injection molded area 6. This component is also shown larger in FIG. 3.

Figure 4:
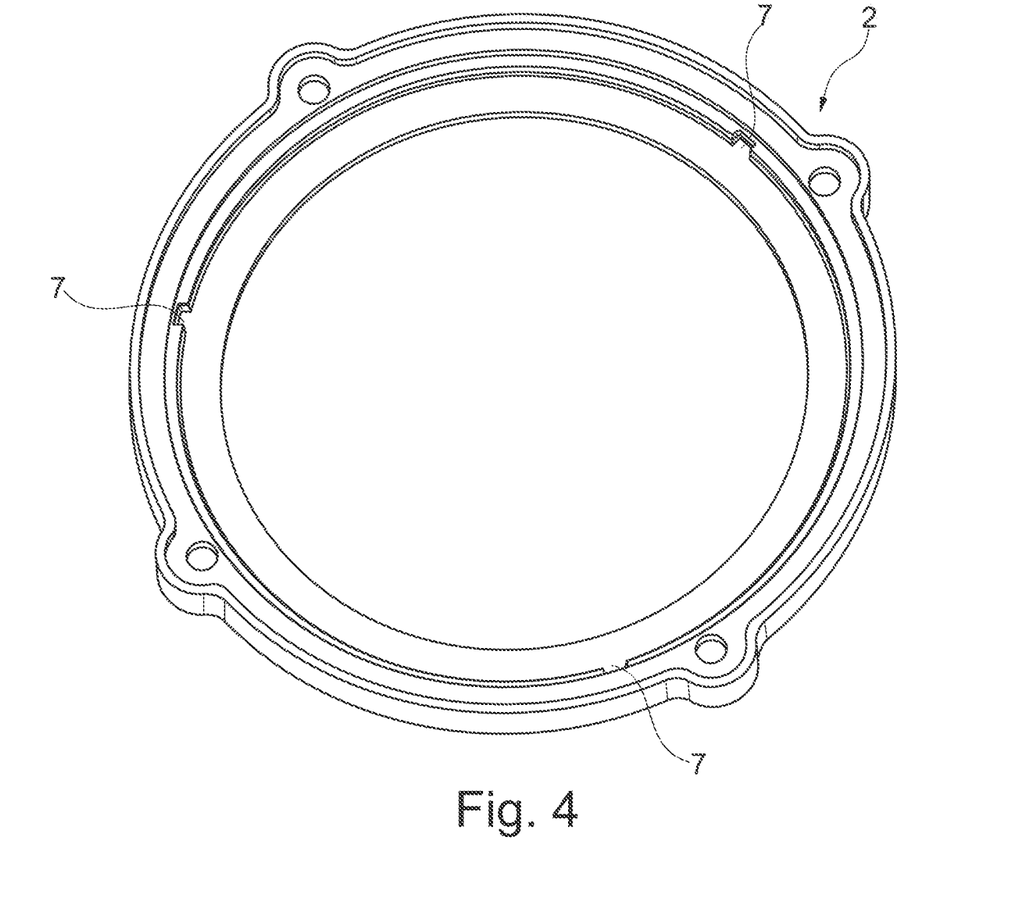
Figure 5:
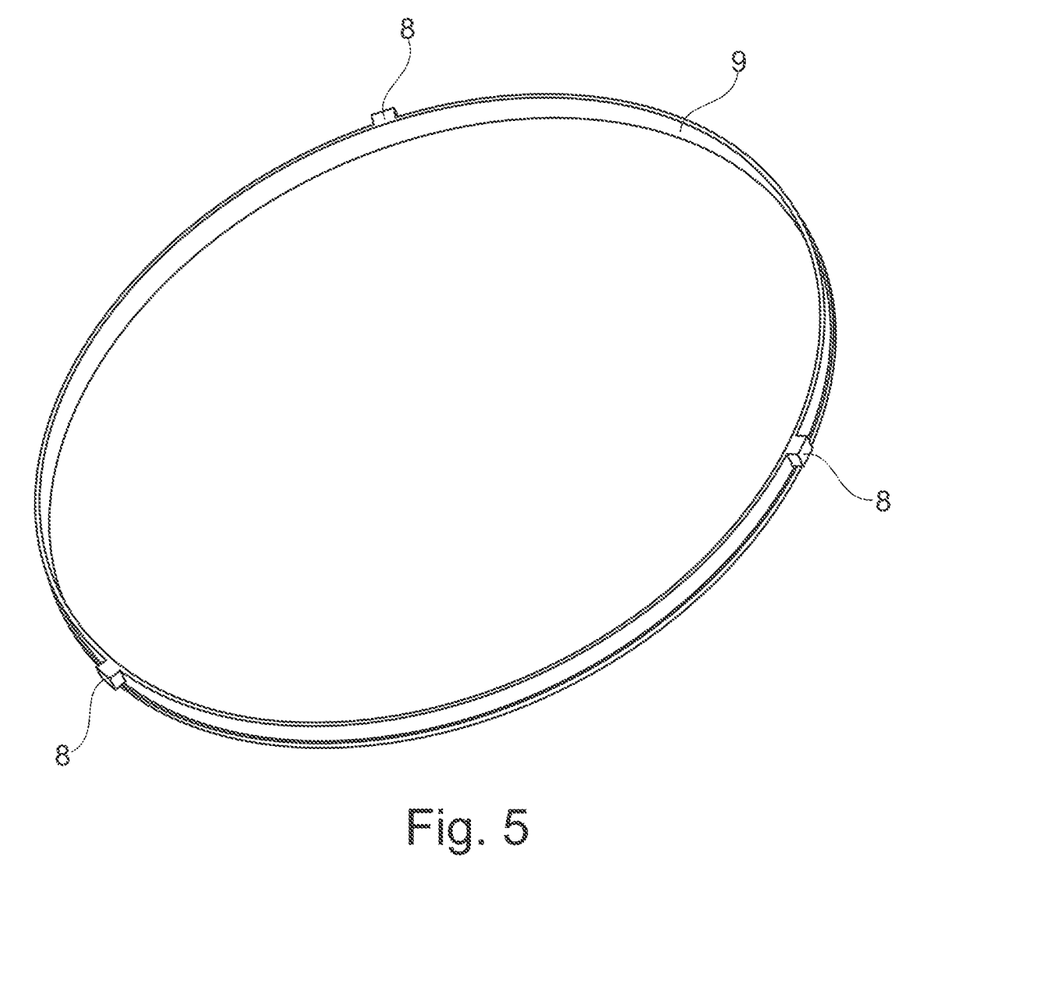

In FIG. 4, the tensioner housing 2 (the shown component is the closing disk 11) is shown how it is arranged next to the tensioner lever 3 according to FIG. 2.

In FIG. 4, recesses 7 are arranged offset relative to each other by 120° and have a rectangular formation. Projections 8 of an intermediate ring 9 engage in these formations/recesses 7.

Coming back to FIG. 2, an adapter plate 10 should be noted that holds the base plate 5 between the tensioner housing 2 formed as closing disk 11 and the adapter plate 10.

The projections 8 of the intermediate ring 9 project radially outward. An elastic damping component 12 is inserted between the intermediate ring 9 and the closing disk 11.

Figure 6:
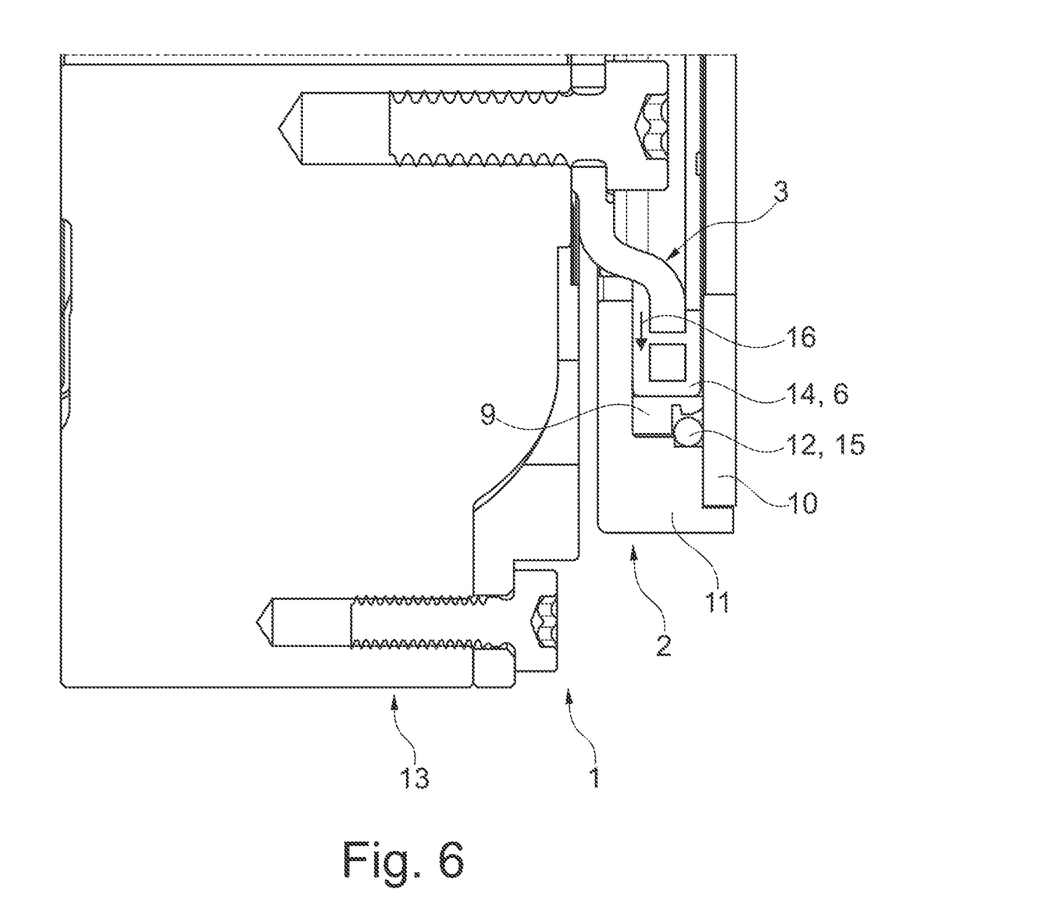

In FIG. 6, the belt tensioner 1 is shown in an arrangement adjacent to an alternator housing 13. In the embodiment presented there, a bearing partner is the tensioner lever 3, which has the base plate 5 that is provided with an injection molding 14 in the injection molding area 6. The injection molding 14 is formed of plastic, namely polyamide, preferably PA46.

The tensioner housing 2 has a base plate, namely the closing disk 11 and a sliding device, namely the intermediate ring 9. In between, the elastic damping component 12, according to the design of an O-ring 15, is inserted. Adjacent to the O-ring 15 is the adapter plate 10. Radial forces act along the arrow 16. The base plate 5 is formed of a metal, preferably an aluminum alloy or a steel alloy; preferably it is constructed as a deep-drawn plate. The O-ring 15 is tensioned in the axial direction and in this way deformed into an oval shape.

Figure 7:
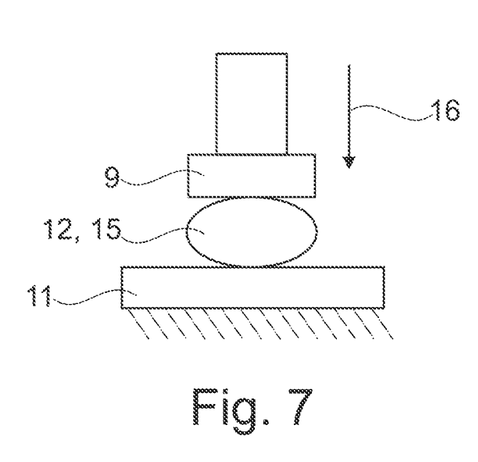
Figure 8:
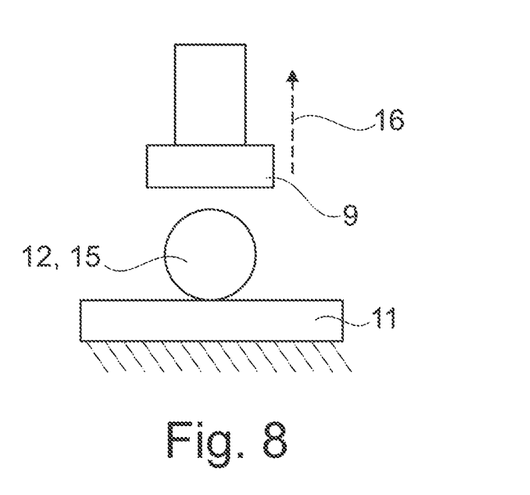

The closing disk 11 and/or the intermediate ring 9 is/are made from metal, in particular, an aluminum alloy or steel. As shown in FIGS. 7 and 8, the radial forces 16 can also be designated as resultant forces ($F_{res}$).

Figure 9:
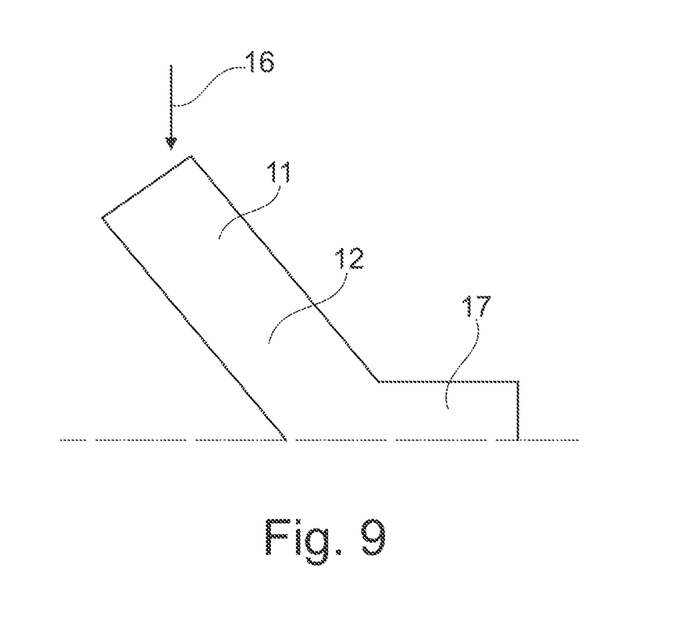

In FIG. 9, a V-shaped construction of the elastic damping component 12 is realized, wherein lips 17 project at an angle to each other.

Figure 10:
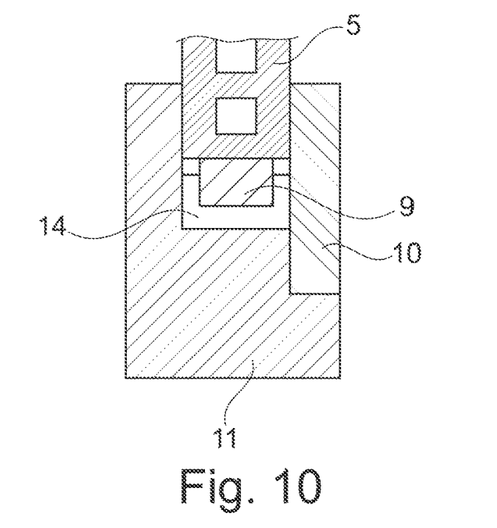

In FIG. 10, the injection molding 14 can be seen easily, which is formed as an elastomer injection molding.

Figure 11:
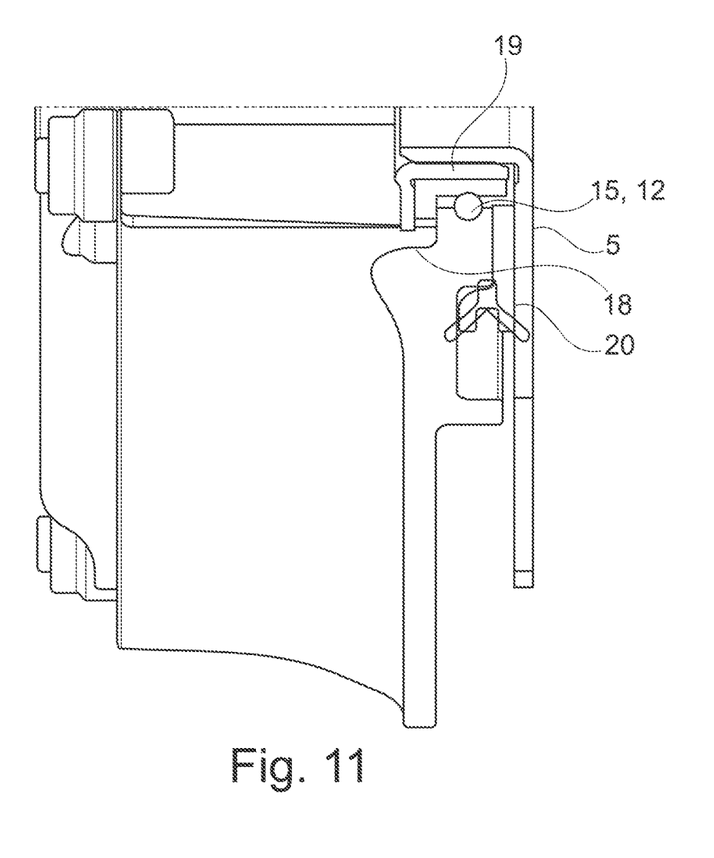

In FIG. 11, a sliding bearing socket 18 is used that is present next to a bearing sleeve 19. A friction disk 20 is also used.

List of Reference Symbols
1 Belt tensioner
2 Tensioner housing
3 Tensioner lever
4 Tensioning roller
5 Base plate
6 Injection molding area
7 Recess
8 Projection
9 Intermediate ring
10 Adapter plate
11 Closing disk
12 Elastic damping component
13 Generator housing
14 Injection molding
15 O-ring
16 Radial force
17 Lip
18 Sliding bearing socket
19 Bearing sleeve
20 Friction disk

The invention claimed is:

1. A belt tensioner for an auxiliary unit belt drive of an internal combustion engine, the belt tensioner comprising: a tensioner housing, a tensioner lever, a sliding bearing for pivoting radial support of the tensioner lever in the tensioner housing, a first bearing partner associated with the tensioner lever located in sliding contact with a second bearing partner allocated to the tensioner housing, one of the first or second bearing partners is mounted in a radially elastic manner on an associated one of the tensioner lever or the tensioner housing in a rotationally fixed manner.

2. The belt tensioner according to claim 1, wherein the rotationally fixed one of the first or second bearing partners has a two-part construction, including a base body that is separate from a sliding device.

3. The belt tensioner according to claim 2, wherein the sliding device is formed as an intermediate ring, and the base body and the sliding device from the tensioner housing.

4. The belt tensioner according to claim 2, wherein the sliding device is held rotationally locked on the base body but displaceable in a radial direction relative to the base body.

5. The belt tensioner according to claim 2, further comprising an elastic damping component located between the base body and the sliding device, and the elastic damping component is formed from a more elastic material than at least one of the base body or the sliding device.

6. The belt tensioner according to claim 3, wherein the intermediate ring is rotationally locked with a non-positive fit, material fit, or positive fit connection on the base body of the tensioner housing.

7. The belt tensioner according to claim 6, the connection is a positive fit connection that is produced by intermeshing of a projection in a recess.

8. The belt tensioner according to claim 7, wherein the projection includes multiple projections formed as tabs that each engage in corresponding ones of the recesses formed as openings.

9. The belt tensioner according to claim 7, wherein the tabs are offset by 180°, 120°, or 90° relative to each other.

10. The belt tensioner according to claim 1, wherein the first or second bearing partner is mounted in the radially elastic manner using an elastic floating arrangement including is realized by an O-ring or a spring.

11. A belt tensioner:
a tensioner housing,
a tensioner lever,
a sliding bearing for pivoting radial support of the tensioner lever in the tensioner housing, the sliding bearing including a first bearing partner associated with the tensioner lever and a second bearing partner allocated to the tensioner housing, the first or second bearing partners being in sliding contact with one another, and
an elastic damping element located radially between one of the first or second bearing partners and an associated one of the tensioner lever or the tensioner housing.

12. The belt tensioner of claim 11, wherein the one of the first or second bearing partners adjacent to the elastic damping element is rotationally fixed and radially moveable.

13. The belt tensioner of claim 12, wherein the rotationally fixed one of the first or second bearing partners has a two-part construction, including a base body an intermediate ring.

14. The belt tensioner of claim 13, wherein the intermediate ring is rotationally locked on the base body and displaceable in a radial direction relative to the base body.

15. The belt tensioner of claim 14, wherein the intermediate ring is rotationally locked with a positive fit connection on the base body.

16. The belt tensioner of claim 11, wherein the elastic damping element comprises an O-ring or a spring.

* * * * *